United States Patent Office 3,418,317
Patented Dec. 24, 1968

3,418,317
1H-2,3-BENZOXAZINE-4(3H)-ONE AND ITS 3- AND/
OR 6-SUBSTITUTED DERIVATIVES
Giorgio Pifferi, Milan, Italy, and Emilio Testa, Tessin,
Switzerland, assignors to Lepetit S.p.A., Milan, Italy
No Drawing. Filed Sept. 30, 1966, Ser. No. 583,430
Claims priority, application Great Britain, Oct. 12, 1965,
43,241/65
5 Claims. (Cl. 260—244)

ABSTRACT OF THE DISCLOSURE

A new class of compounds is described, 1H-2,3-benzoxazine-4(3H)-one and its 3- and/or 6-substituted derivatives. The compounds are prepared from an α-aminoxy-o-toluic acid, and have proved to be active as anti-inflammatory, cardiovascular and central nervous system depressant agents.

This invention is concerned with a new class of compounds and with the method for preparing the same. More particularly, the compounds to which the invention relates are 1H-2,3-benzoxazine-4(3H)-ones of the formula

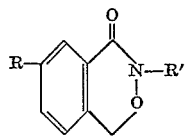

wherein R is a member of the class consisting of hydrogen, halogen, nitro and amino groups and R' is a member of the class consisting of hydrogen, lower alkyl, lower aliphatic carboxylic acid acyl, 4-chlorobenzoyl, 4-isobutylphenylacetyl and a radical of the formula —$C_nH_{2n}NB$ wherein $n$ is an integer number from 1 to 4, NB is a member of the class consisting of di-lower-alkyl-amino, 4-methylpiperazino and 4-morpholino.

The process for preparing the compounds of this class consists mainly in a cyclization of an α-aminoxy-o-toluic acid, which can be carried out using various condensing agents, such as sulfuric acid or acetic anhydride, and also by heating in toluene or acetic acid solution.

The synthesis of the above mentioned α-aminoxy-o-toluic acid is carried out starting from a phthalide, which is treated with HBr to give a α-bromo-o-toluic acid, which is subsequently converted into its acid chloride and then into its ethyl ester. This compound being not stable, it can be reacted in a crude state with the K salt of hydroxyurethan; the resulting ethyl-α-(carbethoxyaminoxy)-o-toluate is treated with HCl, so that by hydrolysis the α-aminoxy-o-toluic acid is obtained and converted, as above indicated, into the desired 1H-2,3-benzoxazine-4(3H)-one according to the following scheme:

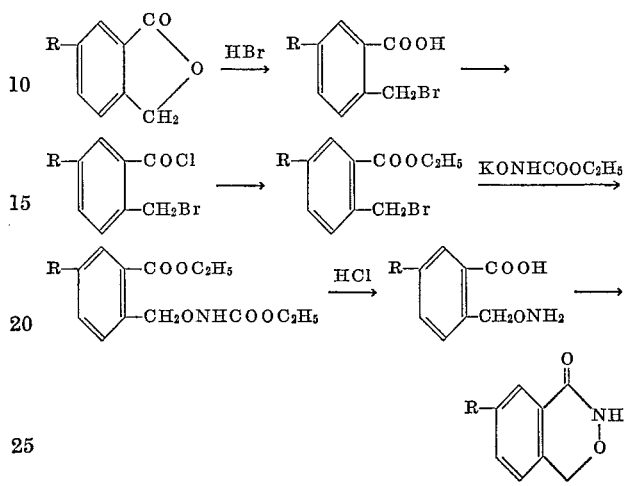

The 1H-2,3-benzoxazine-4(3H)-ones are generally crystalline and stable. They react with carboxylic acid chlorides or anhydrides in pyridine to give the corresponding 3-acyl-derivatives. Alternatively, the benzoxazinones can be reacted with sodamide in an inert anhydrous organic solvent; the resulting sodium salt gives with alkyl and substituted alkyl halides the corresponding alkyl and substituted alkyl derivatives. These reactions can be represented as follows:

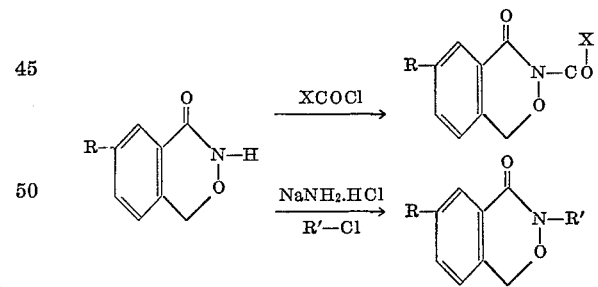

The 1H-2,3-benzoxazine-4(3H)-ones and their 3-acyl, 3-alkyl and 3-substituted alkyl derivatives and their preparation all form the subject of this invention.

The compounds are pharmacologically active as central nervous system depressants, anti-inflammatory and cardiovascular agents.

On the isolated guinea pig heart the compound of Example 18 caused a very marked increase of coronary flux, ranging between +88% at a concentration of 20 γ/ml. and about +50% at 1 γ/ml. The compound of Example 8, when tested for its anti-inflammatory activity by the carragenin edema test in the rat, showed a decrease of over 20 percent of edema at a dose of 20 mg./kg. per os. Comparable results were obtained with the other compounds.

The following non-limitative examples illustrate the invention.

EXAMPLE 1

(1) Preparation of 1H-2,3-benzoxazine-4(3H)-one

To 5 litres of glacial acetic acid saturated with dry hydrobromic acid at 5° C., a solution of 750 g. of phthalide in 1.7 litres of glacial acetic acid is slowly added. The reaction mixture is then saturated again with dry hydrobromic acid at 5° C., stirred for 2 hours at room temperature and for 1 hour at 70° C. After standing overnight, the precipitate is collected and the filtrate is poured into ice-water, a second crop of crystals being obtained. The precipitates dried at 50° C. under vacuum gave 860 g. (yield 72.5%) of α-bromo-o-toluic acid, M.P. 149–150° C.

A mixture of 750 g. of said compound and 810 ml. of thionyl chloride is refluxed for 3 hours under anhydrous conditions. The excess of thionyl chloride is removed in vacuo and the residue is evaporated to dryness after treatment with benzene. The oil is crystallized from hexane and the precipitate is collected, washed with hexane and dried over $P_2O_5$. Total yield 770 g. (91%), M.P. 46–48° C. It is α-bromo-o-toluic acid chloride.

An amount of 768 g. of the above compound is added in small portions to 1.8 l. of absolute ethanol at 20° C. After standing for 24 hours at room temperature the solvent is distilled, the oily residue dissolved in ether, washed with dilute sodium bicarbonate and dried over anhydrous sodium sulfate. The solvent is removed without heating, yielding 712 g. (89%) of α-bromo-o-toluic acid ethyl ester. The crude product of the foregoing reaction is entirely and quickly added to a stirred suspension of 760 g. of crude potassium hydroxyurethan in 2.4 l. of anhydrous dimethylformamide. The mixture is heated for 2 hours at 70° C., then concentrated in vacuo. Water (1.1 l.) and 175 ml. of 10% sodium hydroxide are added to the residue and the mixture is extracted with ether. The ether solution is washed with water and dried and the solvent is evaporated. The crude oil [ethyl-α-(carbethoxyaminoxy)-o-toluate] weighs 740 g. (94.5%) and is used as such in the following reaction.

An amount of 740 g. of said compound is refluxed in 5.5 ml. of concentrated hydrochloric acid for 7 hours. The mixture is concentrated in vacuo to one half of its volume and extracted with ethyl acetate to remove the unreacted product. The aqueous solution is evaporated to dryness under reduced pressure, and the residue, dried at 100° C., gives 345 g. of crude hydrochloride of α-aminoxy-o-toluic acid, in the form of white crystals, that are taken up with 1 l. of warm water (45° C.) and filtered from an insoluble residue. The filtrate is neutralized to pH 4.5 with 10% sodium hydroxide, the precipitate is collected, washed with a small volume of cold water and dried in vacuo at 40° C.; yield 320 g. of α-aminoxy-o-toluic acid (70%), M.P. 112–118° C.

A suspension of α-aminoxy-o-toluic acid (174 g.) in 1 l. of glacial acetic acid, is heated on a steam bath for 4 hours. The cloudy solution is filtered, distilled and the residue dissolved in 400 ml. of hot ethanol. On cooling 116 g. of 1H-2,3-benzoxazine-4(3H)-one, M.P. 124–126° C. are obtained (yield 75%).

EXAMPLES 2–4

By the same process as above described the following 6-substituted 1H-2,3-benzoxazine-4(3H)-ones were prepared:

(2) 6-Cl M.P. 190–192° C. (from ethanol).
(3) 6-$NO_2$ M.P. 202–204° C. (from ethanol).
(4) 6-$NH_2$ M.P. 173–175° C. (from ethanol).

EXAMPLE 5

Preparation of 3-(p-chlorobenzoyl)-1H-2,3-benzoxazine-4(3H)-one

An amount of 4.2 g. of p-chlorobenzoylchloride is slowly dropped with stirring into a solution of 3.5 g. of 1H-2,3-benzoxazine-4(3H)-one in 40 ml. of anhydrous pyridine. The mixture is warmed at 50° C. for 5 hours, then cooled and diluted with ether. The precipitate is collected by suction, washed with water and dried to give 4.6 g. (70%) of 3-p-chlorobenzoyl-1H-2,3-benzoxazine-4(3H)-one; M.P. 169–170° C.

EXAMPLES 6–8

By the same method the following compounds were obtained:

(6) 3-acetyl - 1H-2,3-benzoxazine - 4(3H)-one; M.P. 115–116° C.; yield 98.5%.
(7) 3-propionyl-1H-2,3-benzoxazine-4(3H)-one; M.P. 107–108° C.; yield 75%.
(8) 3-(4-isobutylphenylacetyl) - 1H-2,3-benzoxazine-4(3H)-one.

EXAMPLE 9

Preparation of 3-ethyl-1H-2,3-benzoxazine-4(3H)-one

Finely powdered sodamide is added to a solution of 4 g. of 1H-2,3-benzoxazine-4(3H)-one in 40 ml. of anhydrous dioxane, and the mixture is heated at 70° C. for 1 hour. A solution of 4 g. of ethyl bromide in 15 ml. of anhydrous benzene is then added dropwise. The mixture is refluxed with stirring for 10 hours, cooled and the insoluble salts are removed by suction. The filtrate is washed with water, dried over anhydrous sodium sulfate and distilled to give 3 g. (63%) of oily 3-ethyl-1H-2,3-benzoxazine-4(3H)-one, B.P. 126–130° C./1 mm. (air bath).

EXAMPLE 10

Following the above method 3-n-butyl - 1H-2,3-benzoxazine-4(3H)-one is prepared; yield 60%, B.P. 126–130° C./0.8 mm.

EXAMPLE 11

Preparation of 3-(2-piperidinoethyl)-1H-2,3-benzoxazine-4(3H)-one

To a solution of 3.5 g. of 1H-2,3-benzoxazine-4(3H)-one in 50 ml. of anhydrous dioxane 0.02 mole of finely powdered sodamide are added. The mixture is stirred for 1 hour at 70° C., then a solution of 3.5 g. of 1-(2-chloroethyl)-piperidine in 20 ml. of anhydrous benzene is dropped in and the mixture is refluxed for 10 hours. After cooling and removing the salts by suction, the filtrate is evaporated to dryness. Ether is added to the oily residue and the solution is extracted with cold dilute hydrochloric acid. The acid aqueous layer is made alkaline with a saturated solution of sodium carbonate and extracted twice with ether. The combined ether extracts are washed with water, dried over sodium sulfate, concentrated and the residue distilled in glass bulbs. Yield 4.1 g. (67%) of 3-(2-piperidinoethyl)-1H-2,3-benzoxazine-4(3H-one, B.P. 180° C./0.8 mm. (air bath).

EXAMPLES 12–17

According to the described method the following compounds were prepared

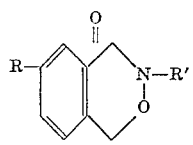

| Example | R' | R | B.p. or M.p. | Yield, percent |
|---|---|---|---|---|
| 12 | (CH₃)₂N(CH₂)₂— | H | 150–152° C./0.8 mm | 60 |
| 13 | (CH₃)₂N—(CH₂)₃— | H | 150–155° C./1 mm | 70 |
| 14 | (C₂H₅)₂N(CH₂)₂— | H | 152–155° C./0.8 mm | 81 |
| 15 | CH₃—N⟨ ⟩N—(CH₂)₂— | H | 180–181° C./0.7 mm | 65 |
| 16 | CH₃—N⟨ ⟩N—(CH₂)₃— | H | 200–203° C./0.6 mm | 65 |
| 17 | O⟨ ⟩N—CH₂— | H | 99–100° C. | 62 |

EXAMPLE 18

Preparation of 6-chloro-3-(β-dimethylaminoethyl)-1H-2,3-benzoxazine-4(3H)-one hydrochloride An amount of 0.56 g. of finely powdered sodamide is added to a solution of 2.57 g. of 6-chloro-1H-2,3-benzoxazine-4(3H)-one in 30 ml. of anhydrous dioxane, the mixture is heated for 2 hours at 70–80° C., then dropwise treated with a solution of 1.81 g. of (2-chloroethyl)-dimethylamine in 15 ml. of dry benzene. The mixture is heated 10 hours under stirring, then it is cooled, the precipitate is removed by suction and the filtrate is evaporated to dryness. The residue is taken up with cold diluted hydrochloric acid and the solution is extracted with ether. The acidic mother liquor is alkalized with a concentrated Na₂CO₃-solution, then extracted with ether. The extract is dried over Na₂SO₄, then treated with another solution of HCl. The precipitate, that is 6-chloro-3-(β-dimethylaminoethyl) - 1H-2,3-benzoxazine - 4(3H)-one hydrochloride is collected and crystallized from ethanol-ether. Yield 2.5 g. (61%), M.P. 203–204° C.

We claim:
1. A process for preparing a 1H-2,3-benzoxazine-4(3H)-one of the formula

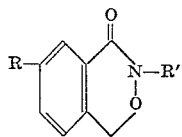

wherein R is a member of the class consisting of hydrogen, halogen, nitro and amino, R' is a member of the class consisting of hydrogen, lower alkyl, lower alkanoyl, 4-chlorobenzoyl, 4-isobutylphenylacetyl and a radical of the formula —C$_n$H$_{2n}$NB, wherein n is an integer number from 1 to 4, NB is a member of the class consisting of di-lower alkylamino, 4-methylpiperazino and 4-morpholino, which comprises subjecting to the action of a dehydrating agent an α-aminoxy-o-toluic acid of the formula

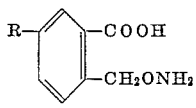

wherein R has the above significance, and if desired converting the obtained 1H-2,3-benzoxazine-4(3H)-one to a N-substituted derivative by reaction with an agent selected from the group consisting of lower alkyl halides, lower alkanoyl halides, 4-chlorobenzoyl chloride, 4-isobutylphenylacetyl chloride, and a compound of the formula XC$_n$H$_{2n}$NB, wherein X is a halogen atom, n and NB have the above indicated significance.

2. A compound of the formula

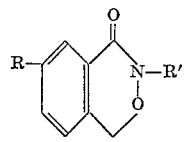

wherein R is a member of the class consisting of hydrogen, halogen, nitro and amino, R' is a member of the class consisting of hydrogen, lower alkyl, lower alkanoyl, 4-chlorobenzoyl, 4-isobutylphenylacetyl and a radical of the formula —C$_n$H$_{2n}$NB, wherein n is an integer number from 1 to 4, and NB is a member of the class consisting of di-lower alkylamino, 4-methylpiperazino and 4-morpholino.

3. A compound as in claim 2, having the formula

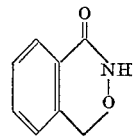

4. A compound as in claim 2, having the formula

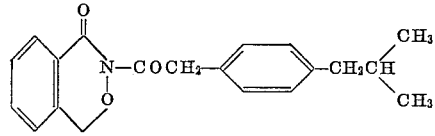

5. A compound as in claim 2, having the formula

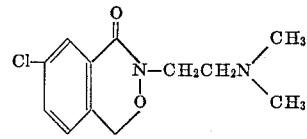

References Cited

UNITED STATES PATENTS

| | | | |
|---|---|---|---|
| 3,073,743 | 1/1963 | Spero | 167—65 |
| 3,086,911 | 4/1963 | Brown et al. | 167—65 |
| 3,144,387 | 8/1964 | Jones | 167—65 |
| 3,144,388 | 8/1964 | Kühnis et al. | 167—65 |

OTHER REFERENCES

Patterson et al.: The Ring Index, 2nd ed. p. 203 Washington, D.C., Amer. Chem. Soc., 1960 QD 291. P3.

HENRY R. JILES, *Primary Examiner.*

NATALIE TROUSOF, *Assistant Examiner.*

U.S. Cl. X.R.

167—65; 260—247.2, 471, 476, 514, 518, 544